Figure 1:
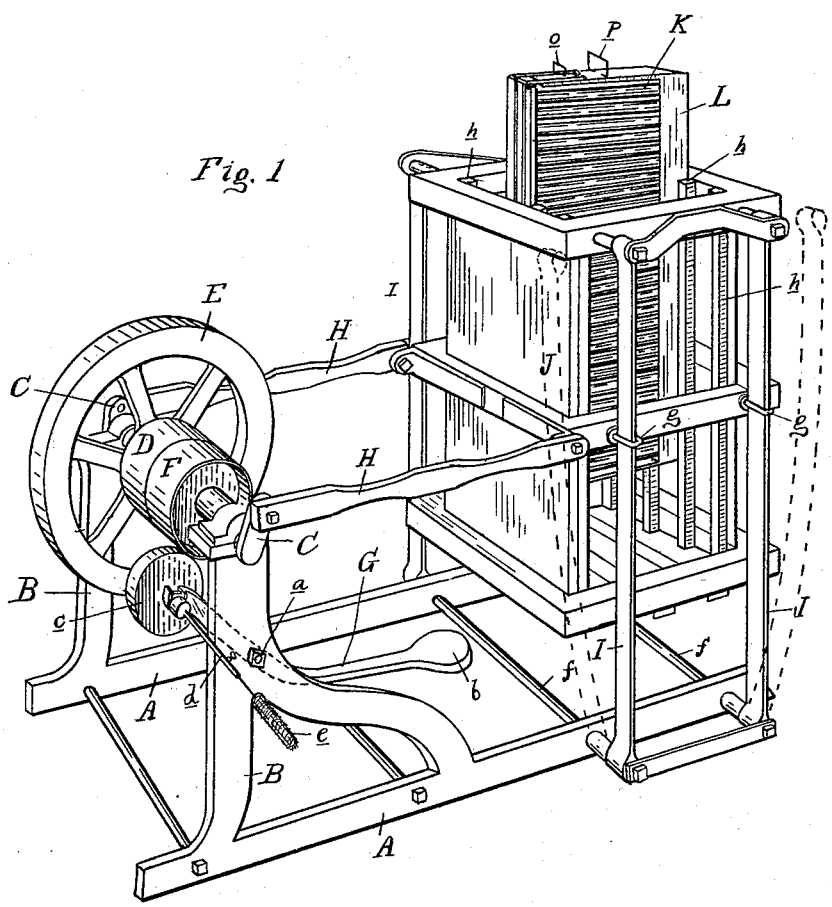

(No Model.) 2 Sheets—Sheet 1.

J. P. WOOD.
CREAM TESTING CHURN.

No. 383,082. Patented May 15, 1888.

Witnesses:
P. M. Hulbert,

Inventor:
James P. Wood.
By Thos. S. Sprague & Son
Atty.

(No Model.) 2 Sheets—Sheet 2.
J. P. WOOD.
CREAM TESTING CHURN.
No. 383,082. Patented May 15, 1888.
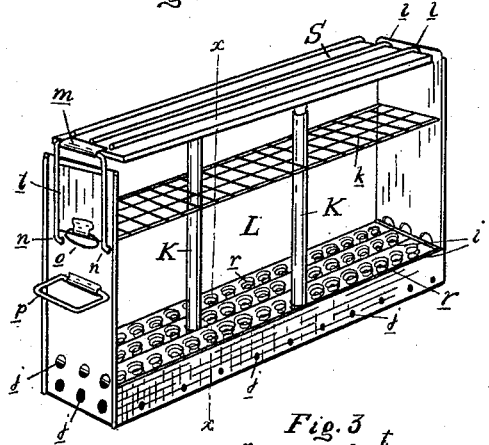
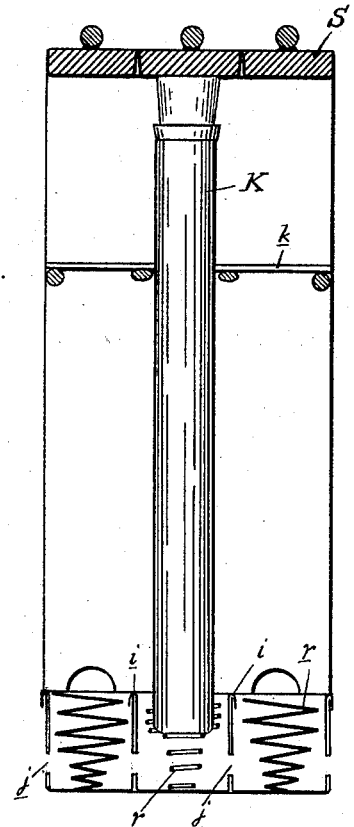
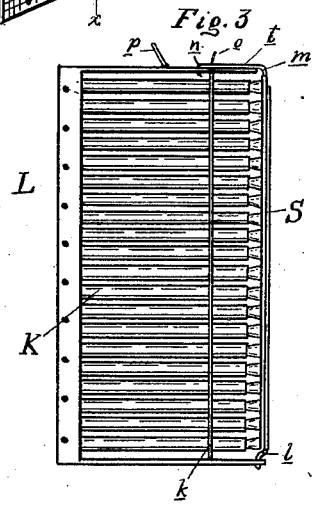
Witnesses:
P. M. Hulbert
[signature]
Inventor:
James P. Wood
By Thos. S. Sprague & Son
Att'y.

UNITED STATES PATENT OFFICE.

JAMES P. WOOD, OF CHELSEA, MICHIGAN, ASSIGNOR OF ONE-HALF TO GEORGE P. GLAZIER, OF SAME PLACE.

CREAM-TESTING CHURN.

SPECIFICATION forming part of Letters Patent No. 383,082, dated May 15, 1888.

Application filed October 11, 1887. Serial No. 251,995. (No model.)

*To all whom it may concern:*

Be it known that I, JAMES P. WOOD, a citizen of the United States, residing at Chelsea, in the county of Washtenaw and State of Michigan, have invented certain new and useful Improvements in Cream-Testing Churns, of which the following is a specification, reference being had therein to the accompanying drawings.

This invention relates to new and useful improvements in cream-testing churns; and the invention consists in the peculiar construction and arrangement of the parts, whereby the machine is simplified in its construction and made more effective in its operation, all as more fully hereinafter described.

In the drawings which accompany this specification, Figure 1 is a perspective view of the machine, with one case of test tubes or bottles placed partly in the churn frame or crate. Fig. 2 is a perspective view of one of the bottle-cases. Fig. 3 is a plan of one of the bottle-cases with the test-bottles in position. Fig. 4 is a cross-section of the bottle-case on the line $x\ x$ of Fig. 2, showing how the test-bottles are secured in the case.

A is a suitable frame upon which the device is supported, having at one end the standards B, in the upper ends of which a shaft is suitably journaled. Such shaft extends beyond the outer sides of the standard, and is provided at each end with a crank, C. Upon the shaft between the standards is secured a suitable drive-pulley, D, fly-wheel E, and the loose pulley F. An arm or lever, G, is pivotally attached to one of the standards at $a$, and at the lower end this arm is provided with the weight $b$. The opposite and upper end of this arm is bifurcated, and has suitably journaled between the bifurcations the wheel $c$, which is held in frictional contact with the loose pulley F by the action of the counterbalance-weight $b$. The shaft of the wheel $c$ is provided with a socket, to admit of a spindle, $d$, to which a brush, $e$, may be secured in any suitable manner.

I I are flat springs, pivotally connected at their lower ends to the main frame in any suitable manner, as by the bolts $f$, and extending upwardly parallel with each other they are pivotally connected at their upper ends at or near the top of the churn-frame; and intermediate between the upper and lower end, preferably at or near the middle of the frame, they are attached thereto by means of the staples $g$ or otherwise, so as to permit a vertical play.

Connection is made with the drive mechanism and the churn-frame by means of the pitmen H H, which are pivotally connected at one end to the churn-frame and at the other to the cranks of the drive-shaft. It will be seen that with this connection, motion being applied to the drive mechanism, the churn-frame will have an easy to-and-fro motion, without the possibility of side motion, but owing to the action of the springs the to-and-fro motion is quite peculiar and different from the rectilinear motion given to the churn-frame in other constructions. When the cranks are at right angles with the pitmen, the springs are in vertical position and free from tension, but at each end of the stroke the springs become deflected, as shown in dotted lines in Fig. 1; but this tension is rapidly relieved after the cranks pass the centers, imparting thereby an easy lifting motion to the churn-frame, which largely increases the churning action without producing any jarring, rattling, or side motion.

The churn frame or crate J is made in the shape of a rectangular box, preferably open, or partially so, at the sides, top, and bottom, and provided upon the inside with the guides $h$, between which the bottle-cases are placed. The top of the crate J is made open, to admit of placing the bottle-cases L in position, and the bottom is provided with a few slats or rests for the same, the other sides being open to freely admit air to all parts. The advantage of this construction of the churn frame or "crate," as it is often named, is that as the bottles are placed therein for churning at a high temperature their temperature is speedily reduced to about 90° Fahrenheit when the butter-making is commenced.

In my construction the free admission of the air to all parts of the crate permits the cooling of the bottles to the desired temperature much more rapidly than in other constructions, thus shortening materially the time of the operation.

The bottle-cases L, in which the bottles K are placed, are of substantially rectangular form, as shown in Figs. 2 and 3, and preferably made of metal. The bottom of the case is divided longitudinally into compartments by the strips $i$, which are provided with the apertures $j$, for convenience in cleaning, and between these strips $i$, secured to the bottom of the case, are the volute helical springs $r$, of a number to correspond with the bottles to be used. The interior diameter of the upper coils of the springs is sufficiently large to admit the insertion of the base of the bottle and form a secure receptacle for the bottle. The cover S of the bottle-case is detachably secured, and can be clamped down in position tightly against the tops of the bottles, whereby the springs are compressed, so that they serve the double purpose of receptacles for the bases of the bottles to prevent them from coming in contact with each other, and as tension devices to hold the bottles firmly in position against accidental displacement, as shown in Fig. 4.

Near the top of the bottle-case is the open frame-work $k$, arranged with its apertures to correspond with the springs below, which acts as an additional support for the bottles, as shown. The top of the bottle-case is removably hinged at one end by the hooks $l$, which engage in suitable holes in the side of the case, and is secured to the case by means of a hasp, $t$, pivotally connected at $m$ to the cover, and provided with bends or hooks $n$, which engage in suitable holes in the side of the case. This hasp is provided with the handle $o$, more readily to disengage it, and the end of the case is provided with the handle $p$, by which it may be readily lifted in and out of position in the churn-crate.

In practice, the parts being constructed as described, the bottle-case being empty, the cover off, each sample of cream is put in a bottle, marked, corked, and placed in position in the bottle-case, as shown in Figs. 2, 3, and 4. The hooks $l$ of the cover are engaged in the holes and the cover brought into position for locking, which action requires pressure to be brought upon the tops of the bottles, compressing the springs $r$ until the hooks $n$ are engaged in their locking-holes. The bottles thus being securely held in position, the bottle-case may be placed in hot water to raise the bottles and their contents to the required temperature, and it is then placed in position in the crate, as shown in Fig. 1. Motion being imparted to the device, the cream is churned and the value of the cream determined in the well-known manner.

It has always been a tedious and irksome task to properly clean the bottles, which are necessarily of small diameter and of considerable length, and to obviate this trouble I provide the means heretofore described of securing in the wheel $c$ the spindle $d$ and brush $e$. When the belt is shifted upon the loose pulley, motion is imparted to the wheel $c$ and brush $e$, and thereby means are obtained for rapidly and properly cleaning the bottles.

I am aware that a spring-supported frame is not new in this connection, and therefore do not seek to cover such broadly.

What I claim as my invention is—

1. In a cream-testing churn, the combination of a supporting-frame, a churn-crate provided with removable bottle-cases, spring supports attached at the upper corners and passing through guiding-keepers at the vertical center of the churn-crate, and a revolving crank-shaft and pitman connection between said shaft and the churn crate, substantially as described.

2. In a cream-testing churn, the combination of a supporting-frame, a churn-crate provided with removable bottle-cases, spring-supports attached at the upper corners and passing through guiding-keepers at the vertical center of the churn-crate, a revolving shaft to which said churn-crate is reciprocatingly connected, a loose pulley, and a fast drive-pulley, substantially as described.

In testimony whereof I affix my signature, in presence of two witnesses, this 30th day of September, 1887.

JAMES P. WOOD.

Witnesses:
 CHAS. H. CARPENTER,
 ORLANDO A. BOYD.